United States Patent
Harris et al.

(10) Patent No.: US 6,681,328 B1
(45) Date of Patent: Jan. 20, 2004

(54) SYSTEM AND METHOD FOR GLOBAL INTERNET DIGITAL IDENTIFICATION

(75) Inventors: Michael D. S. Harris, Paoli, PA (US); John Wankmueller, New Hyde Park, NY (US)

(73) Assignee: MasterCard International Incorporated, Purchase, NY (US)

(*) Notice: Subject to any disclaimer, the term of this patent is extended or adjusted under 35 U.S.C. 154(b) by 0 days.

(21) Appl. No.: 09/680,006

(22) Filed: Oct. 5, 2000

Related U.S. Application Data

(60) Provisional application No. 60/158,608, filed on Oct. 8, 1999, and provisional application No. 60/163,886, filed on Nov. 5, 1999.

(51) Int. Cl.[7] .................................................. H04L 9/00
(52) U.S. Cl. ...................... 713/175; 713/150; 713/170; 705/50; 705/79
(58) Field of Search ................................. 713/200–202, 713/172, 185, 168, 150, 170, 153, 155–156, 160–161, 175, 179; 705/39–44, 64–67, 70, 75–76, 78, 79, 200–202, 50, 26

(56) References Cited

U.S. PATENT DOCUMENTS

| | | | |
|---|---|---|---|
| 5,513,323 A | * 4/1996 | Williams et al. ............. | 709/246 |
| 5,557,518 A | 9/1996 | Rosen ......................... | 364/408 |
| 5,757,917 A | 5/1998 | Rose et al. ................... | 380/25 |
| 5,761,306 A | 6/1998 | Lewis .......................... | 380/21 |
| 5,790,677 A | 8/1998 | Fox et al. ..................... | 380/24 |
| 5,826,245 A | 10/1998 | Sandberg-Diment ......... | 705/44 |
| 5,883,810 A | 3/1999 | Franklin et al. ....... | 364/479.02 |
| 5,903,652 A | * 5/1999 | Mital .......................... | 705/78 |
| 5,903,882 A | 5/1999 | Asay et al. .................... | 705/44 |
| 6,163,771 A | * 12/2000 | Walker et al. ................ | 705/18 |
| 6,269,348 B1 | * 7/2001 | Pare et al. .................... | 705/39 |
| 6,282,522 B1 | * 8/2001 | Davis et al. .................. | 705/41 |

FOREIGN PATENT DOCUMENTS

| | | |
|---|---|---|
| EP | 0590861 | 4/1994 |
| EP | 0921487 | 6/1999 |
| EP | 0921487 A | * 9/1999 |

OTHER PUBLICATIONS

PricewaterhouseCoopers L.L.P., Security and Electronic Commerce: Digital Signatures and CA,1998,pp. 1–8.*
Josang and Patton, User Requirements for Authentication of Communication,Australian Computer Society,2003.*
FIPS Pub 180–1: 1995 *Secure Hand Standard*, available at http://www.itl.nist.gov/fipspubs/fip 180–1.htm.
*Answers to Frequently Asked Questions about Today's Cryptography*, Paul Fahn, RSA Laboratories, 1993 (http://www.rsa.com/rsalabs/faq/).

* cited by examiner

*Primary Examiner*—Ayaz Sheikh
*Assistant Examiner*—Hosuk Song
(74) *Attorney, Agent, or Firm*—Baker Botts L.L.P.

(57) ABSTRACT

A system and method for authenticating a digital ID can utilize a central switch to transmit data between a network connected to a service provider and a network connected to a digital ID issuer. The system can be configured to provide a "yes/no" authorization or a validation at a selected validation level. The system can receive an encrypted authorization request message, and can generate an encrypted authorization response message. The authorization response message can be used by the service provider to decide whether to provide a service to a digital ID holder.

2 Claims, 1 Drawing Sheet

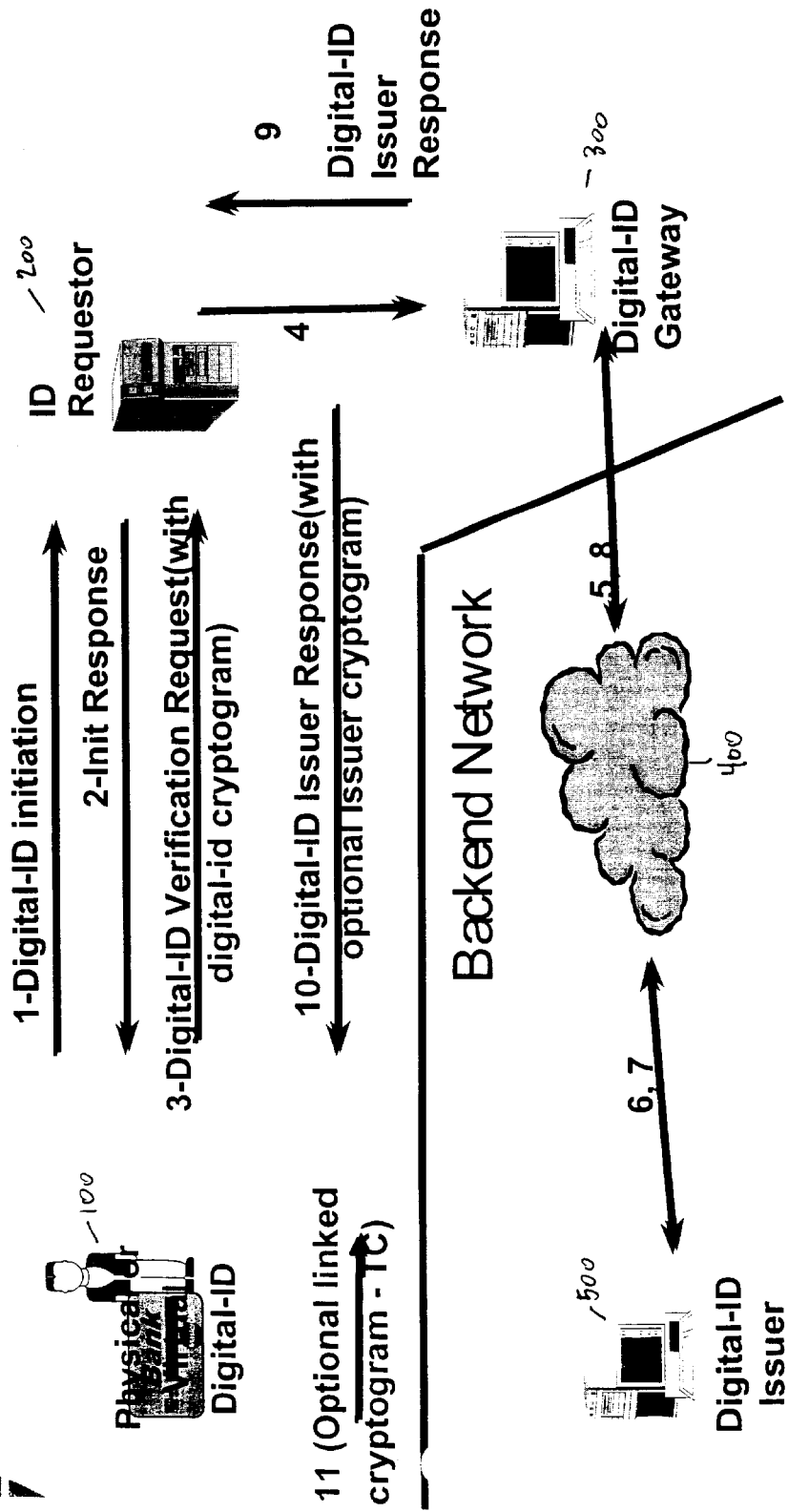

SYSTEM AND METHOD FOR GLOBAL INTERNET DIGITAL IDENTIFICATION

PRIORITY APPLICATIONS

This application is based on priority applications No. 60/158,608 filed in the United States on Oct. 8, 1999, and entitled "Digital Identification Achieved by Using Debit or Credit Transaction Processing System," by Michael D. S. Harris, and is further based on priority application No. 60/163,886 filed in the United States on Nov. 5, 1999, and entitled "System and Method for Global Internet Digital Identification," by Michael D. S. Harris and John Wankmueller. Both of the aforementioned priority applications are hereby incorporated by reference.

FIELD OF THE INVENTION

This invention relates to digital identification (hereinafter "digital ID") applications used to purchase goods or services.

BACKGROUND OF THE INVENTION

A digital ID is a set of digital data associated with an individual or entity. The ID can be, for example, a digital document (e.g. a digital certificate) which associates a digital key with the individual or entity. Digital ID applications for use over the Internet and elsewhere are proliferating. One model for digital ID applications allows a third party service provider on the Internet to perform an exchange with a cardholder accessing the third party site and to retrieve from the cardholder a digital ID that the service provider can then validate with a "central point" before providing service. The service provider goes to the "central point" for each validation and is charged based on the level of assurance that the "central point" is prepared to provide (e.g., 0.10¢ for a guarantee that digital ID is good for $100, 1¢ for a guarantee that digital ID is good for $1000, etc.).

Currently, some parties are attempting to fill a need for new hierarchical/trust models based on new commercial relationships. In contrast, the present invention provides a unique system and method for performing a digital ID function using currently existing payment system building blocks (such as the "EMV" standard promulgated jointly by Europay International S.A., MasterCard International Incorporated, and Visa International Service Association, and the "SET" standard promulgated by SET Secure Electronic Transaction, LLC) and currently existing credit/debit card payment system contractual relationships. It is assumed that the reader is familiar with the EMV and SET standards, which are described in detail in the EMV and SET "References" listed in the "Related References" section below. These documents are incorporated by reference.

SUMMARY OF THE INVENTION

It is an object of the present invention to leverage existing investments and infrastructure to provide a unique system and method for providing digital ID applications.

It is another object of the present invention to enable banks with a way to issue digital IDs at an assurance level with which they are comfortable, without the investment required to set up a new infrastructure or without the requirement to join a new consortium.

It is another object of the present invention to simplify contractual relationships required for providing digital ID applications. Under the present invention, each digital ID issuer has one contractual relationship with a "central switch" and each service provider has one contractual relationship with the "central switch."

It is another object of the present invention to provide standardized assurance levels for service providers. With the present invention, issuers of digital IDs may choose to use some or all of the assurance levels.

It is another object of the present invention to provide a digital ID application that provides a high level of authentication while, at the same time, allowing the digital ID holder to remain anonymous to a digital ID verification requestor.

BRIEF DESCRIPTION OF THE DRAWING

Further objects, features, and advantages of the invention will become apparent from the following detailed description taken in conjunction with the accompanying FIGURE showing illustrative embodiments of the invention, in which:

FIG. 1 is a diagram of information flow in an exemplary system for performing digital ID in accordance with the invention.

In the FIGURE, unless otherwise stated, the same reference numerals and characters are used to denote like features, elements, components, or portions of the illustrated embodiments. Moreover while the subject invention will now be described in detail with reference to the FIGURE and in connection with the illustrative embodiments, changes and modifications can be made to the described embodiments without departing from the true scope and spirit of the subject invention as defined by the appended claims.

DETAILED DESCRIPTION OF THE INVENTION

According to the present invention, a digital ID issuer issues a digital ID to a digital ID holder. When a party desires to authenticate a digital ID holder, the request for digital ID verification is routed to the digital ID issuer over a distributed communication network. The distributed communication network may include the Internet and an existing legacy payment system infrastructure (such as the Banknet infrastructure of MasterCard International Incorporated). The Internet and the existing legacy payment system infrastructure are connected by a "central switch" or gateway (such as a SET gateway).

Digital ID holders are, with the present invention, able to anonymously identify themselves in remote environments, such as the Internet, to other parties. The digital ID is a portable identity object that is simple for digital ID holders to use and can eliminate the need by digital ID holders to remember different passwords and user-ID combinations required to gain access to protected Internet sites. While not revealing any other details of the identity to the identity verification requester, the present invention can release only agreed identity data to the identity verification requester. It is the digital ID issuer who provides and controls all data.

In transmitting the request for digital ID verification, the present invention uses a set of separate, stand-alone, non-payment messages which utilize existing legacy payment system message formats and payment-related data. The digital ID verification request involves the use of a shared secret (of any type) possessed only by the digital ID issuer and the digital ID holder. High security is enabled since the number and types of secrets shared and algorithms used by the parties are varied and potentially non-standard. The digital ID issuer will receive and validate a digital ID payment object, which is created by the digital ID holder with the shared secret. Advantageously, the digital ID payment object is passed as an opaque block (an object that cannot be read) through all intermediary nodes to the digital ID issuer.

When a digital ID issuer receives a digital ID verification request, the digital ID issuer has a number of response options available to it. One option is to simply respond with a binary "yes" or "no" to the digital ID verification request. A second option is to respond with other data which is related to the digital ID holder, such as demographic data, payment history data, and/or other marketing data. Preferably, this other data is non-personally identifiable data, and the dissemination of this other data is pre-approved by the digital ID holder. The data may also include passwords for accessing a service provider's web site.

Previous digital identification technology has employed asymmetric key technology with private/public key pairs and digital certificates, sometimes combined with secured integrated circuit (IC) chip cards. Advantageously, the present invention can be deployed without chip cards or any secure hardware deployed by the digital ID issuer. Moreover, the present invention may use shared symmetric key technology, instead of asymmetric key technology, to provide a digital ID function.

Another unique feature of the present invention is that digital ID verification may occur before and/or after a payment transaction, and the digital ID verification is capable of being linked with the payment transaction through cryptography. The linking is accomplished through the use of a cryptogram, which is an object containing the result of a cryptographic operation. Preferably, the present invention uses time-sensitive data.

A preferred embodiment of the present invention will now be described. In this preferred embodiment, the basic cryptographic techniques utilize parts of the EMV credit or debit payment specification and an EMV infrastructure. An EMV-compliant chip card may be used with this embodiment, but (as already mentioned) chip card use is not required. Instead, an digital ID application may be stored, for example, on a computer that is connected to the Internet. The stored digital ID application stored on the computer could function as a "virtual" chip card.

With reference to FIG. 1, a digital ID issuer 500 (such as a bank) preferably issues a physical or virtual chip card 100 based on the EMV specification. The chip card 100 can, optionally, be direct mailed to an end user. The chip card 100 may contain a single application or multiple applications on it, and can, optionally, be based on the MULTOS™ operating system or on another operating system. It is assumed that the reader is familiar with the MULTOS™ standard, which is maintained by the MAOSCO Consortium. The standard is described in the MULTOS™ "References" listed in the "Related References" section below. These documents are incorporated by reference.

The digital ID issuer 500 assigns a payment-related or non-payment-related digital ID account number within the MasterCard Payment Application (MCPA) function in the chip card 100. However, the digital ID account number is not required to be a credit/debit card account number (and, indeed, for security purposes, it is preferred that the digital ID not be such a number). In essence, the digital ID issuer may deploy digital ID EMV-based applications which do not use credit/debit card account numbers but assign an account number only for digital ID use.

After the digital ID is issued, the cardholder logs onto the Internet and requests a service from a service provider web site (this request represented by arrow 1 of FIG. 1).

Before providing the requested service, the service provider 200 may decide to verify the cardholder's identity. It is up to the service provider to decide the frequency with which it requests verification from its customers. The service provider may request verification each and every time a service is requested, or it may request verification only occasionally.

If the service provider 200 decides to request verification, the service provider preferably initiates a SET specification based transaction (for confidentiality and integrity of messaging over the Internet) and asks the cardholder (this request represented by arrow 2 of FIG. 1) to use its chip card (virtual or physical) to initiate a digital ID verification transaction (shown as arrow 3). The digital ID verification transaction uses the credit/debit payment message formats of the MCPA and EMV specifications. These message formats may be used in a number of ways. For example, the payment amount field may be set to zero and the request may be treated as an authorization for a payment transaction of zero amount. Alternatively, a new message type may be added (for example, a "digital ID request" type) to the existing payment infrastructure. This new message type can be used to redefine certain fields. In particular, the payment field may no longer represent a payment amount, but a validation level amount. For example, if the payment field contains $100, the digital ID issuer will validate the identity of the digital ID at this validation level.

When a cardholder receives a request to initiate a digital ID verification transaction, the cardholder produces an EMV-formatted cryptogram (shown as arrow 3) (such as an authorization request cryptogram or an "ARQC" cryptogram) and provides it to the service provider 200. The cryptogram is then transported (arrow 4) securely over the Internet, protected by (for example) the SET protocol. The cryptogram can be a digital certificate.

The service provider passes this transaction request (arrow 4) over the Internet, using (preferably) the SET protocol, to a "central switch" 300, which may provide a SET payment gateway function. Since the transaction is not a payment, a bank-provided payment gateway is not necessary. The central switch 300 can, optionally, be a SET acquirer.

The switch 300 reformats the verification transaction request to the format for message transmission over a trusted back-end network 400 (such as MasterCard International Inc.'s Banknet network). For example, if the back-end network is MasterCard International Inc.'s Banknet network, the verification request message is formatted as a "0100" chip formatted authorization request message. The reformatted message is then passed (arrow 5) into the trusted back-end network 400, which routes the verification request (arrow 6) to the digital ID issuer 500.

The digital ID issuer 500 authenticates the digital ID verification transaction and stores the transaction for possible service provider fee collection at a level identified and requested on the verification request message. As previously discussed, the response by the digital ID issuer may be a simple "yes" or "no" or it may include other digital ID holder-related data. The response also preferably includes an Authorization Response Cryptogram ("ARPC").

The digital ID issuer 500 responds to the switch via the trusted back-end network 400 with an authorization response message (arrow 7). If the back-end network is MasterCard's Banknet network, the message is a "0110" formatted authorization response message. It is formatted as a payment authorization request but carries digital ID response data. The back-end network 400 then passes the message (arrow 8) to the switch 300.

The switch formats the authorization response message as a SET/EMV response message (arrow 9) to the service provider 200. The response message confirms or denies the digital ID authentication at the requested service level. This response message is similar to an authorization for purchase response.

When the service provider 200 receives the SET/EMV response message, it decides whether to provide service to the cardholder. The service provider may optionally complete the EMV-like transaction by sending a SET message (arrow 10) back to the physical or virtual card.

The functions of the switch system are as follows:
1. Receive and translate SET/EMV messages on the Internet from service providers into 0100 payment formatted messages for Banknet.
2. Identify and translate 0110 formatted messages from Banknet into SET/EMV messages on the Internet to service providers.
3. Identify and log transactions for fee purposes.
4. Gather fees from service providers.
5. Distribute shares of fees to digital ID issuers.
6. Identify new contents of fields on 0100/0110 messages and SET/EMV messages to facilitate identification or non-payment transaction.

To ensure the freshness of a digital ID request and avoid replay of a digital ID request at a later date and time, it is preferred that digital ID devices will generate a random number challenge which is used, along with other data, by the digital ID holder to create the digital ID cryptogram sent to the digital ID issuer for validation. A preferred embodiment is to use SET technology and EMV chip card technology for this function.

A preferred embodiment of the present invention is built upon the EMV electronic commerce specification but includes the following modifications and additions. The digital ID number is preferably a fully "routable" credit or debit primary account number (PAN), but the number is not necessarily related to a payment account. In a preferred embodiment, the digital ID number is not the account number used for payment.

In addition, the present invention also adds the option to save the EMV final Transaction Certificate (TC) by the cardholder system. This final TC (arrow 11) is a cryptographic object that may be used to link a digital ID verification transaction to a payment transaction. The TC is based on the same shared secret as that used in generating the ARQC and on the ARPC received from the digital ID issuer. In those cases when the digital ID issuer is the same as the payment account issuer, the TC (along with the data needed to generate the TC) provides a strong linkage between the digital ID verification transaction and a payment authorization request. To achieve the linkage, the TC may be bundled into a payment transaction as the "random number" used in the initiate payment transaction stage. An advantage to using the TC in this manner is that a lower level of security is needed to transmit the payment transaction data over the Internet. This is because the transaction route has already been verified by the digital ID verification transaction and the receipt of an ARPC.

Although the present invention has been described in connection with particular embodiments thereof, it is to be understood that such embodiments are susceptible of modification and variation without departing from the scope of the inventive concept as defined by the appended claims.

Related References

The following references are hereby incorporated by reference in their entireties:

SET References

*SET Secure Electronic Transaction Specification, Book* 1: *Business Description*, Version 1.0, May 31, 1997 (available at http://www.setco.org/download.html).
*SET Secure Electronic Transaction Specification Book* 2: *Programmer's Guide*, Version 1.0, May 31, 1997 (available at http://www.setco.org/download.html).
*SET Secure Electronic Transaction Specification Book* 3: *Formal Protocol Definition*, Version 1.0, May 31, 1997 (available at http://www.setco.org/download.html).
*SET Glossary of Terms*, July 1999 (available at http://www.setco.org/download.html).
*External Interface Guide to SET Secure Electronic Transaction*, Sep. 24, 1997 (available at http://www.setco.org/download.html).
*SET Generic Cryptogram Extension*, Jul. 19, 1999 (available at http://www.setco.org/download.html).
*SET Japanese Payment Option Extension*, Aug. 24, 1999 (available at http://www.setco.org/download.html).
*SET Merchant Initiated Authorization Extension*, Jul. 19, 1999 (available at http://www.setco.org/download.html).
*SET Online PIN Extensions*, Jul. 19, 1999 (available at http://www.setco.org/download.html).
*SET CVV2/CVC2 Extension*, Sep. 29, 1999 (available at http://www.setco.org/download.html).

EMV References

*EMV '96 Chip Electronic Commerce Specification*, Draft 1.0, 1999.
*EMV '96 Integrated Circuit Card Specification for Payment Systems*, Version 3.1.1, May 31, 1998 (available at http://www.emvco.com/specifications.cfm).
*EMV '96 Integrated Circuit Card Terminal Specification for Payment Systems*, Version 3.1.1, May 31, 1998 (available at http://www.emvco.com/specifications.cfm).
*EMV '96 Integrated Circuit Card Application Specification for Payment Systems*, Version 3.1.1, May 31, 1998 (available at http://www.emvco.com/specifications.cfm).
*Business Functional Requirements for Debit and Credit on Chip*, Version 1.0, Oct. 20, 1997 (available at http://www.mastercard.com/emv/emvspecs02.html#emv2).
*Integrated Circuit Card Application Specifications for Debit and Credit on Chip*, Version 2.0, November 1998 (available at http://www.mastercard.com/emv/emvspecs02.html#emv2).
*Minimum Card Requirements for Debit and Credit on Chip*, Version 2.0, November 1998 (available at http://www.mastercard.com/emv/emvspecs02.html#emv2).
*Terminal Requirements for Debit and Credit on Chip*, Version 2.0, November 1998 (available at http://www.mastercard.com/emv/emvspecs02.html#emv2).
*Integrated Circuit Card Terminal Application Services—Type Approval*, Version 1.0, Oct. 24, 1997 (available at http://www.mastercard.com/emv/emvspecs02.html#emv2).
*Personalization Data Specifications for Debit and Credit on Chip*, Version 1.0, August 1998 (available at http://www.mastercard.com/emv/emvspecs02.html#emv2).

MULTOS References

MAOSCO, *A Guide to the MULTOS Scheme* (2000).
MAOSCO, *Information Bulletin—Introduction to MULTOS & MAOSCO*, Jan. 4, 1998 (available at http://dh007-00.web.dircon.net/present.ihtml).
MAOSCO, *Information Bulletin 6—MAOSCO Policy Position on ITSEC Matters*, Mar. 19, 1999 (available at http://dh007-00.web.dircon.net/present.ihtml).
MAOSCO, *Information Bulletin No. 3—Developing & Loading Applications*, March 1998 (available at http://dh007-00.web.dircon.net/present.ihtml).
MAOSCO, *Information Bulletin No. 4—Using MULTOS*, April 1998 (available at http://dh007-00.web.dircon.net/present.ihtml).
MAOSCO, *Information Bulletin No 5—Application Load/Delete Certificates & Application Load Units*, Mar. 18, 1998 (available at http://dh007-00.web.dircon.net/present.ihtml).
MAOSCO, *Information Bulletin No. 7—Export Controls*, Sep. 29, 1998 (available at http://dh007-00.web.dircon.net/present.ihtml).
MAOSCO, *Information Bulletin No. 8—Obtaining an Implementation Licence*, May 14, 1998 (available at http://dh007-00.web.dircon.net/present.ihtml).
MAOSCO, *Information Bulletin No. 9—Export Controls, End-User Undertaking Guidance*, Mar. 4, 1999 (available at http://dh007-00.web.dircon.net/present.ihtml).
MAOSCO, *Technical Bulletin No. 1—Shell Applications*, Apr. 15, 1999 (available at http://dh007-00.web.dircon.net/present.ihtml).
MAOSCO, *Technical Bulletin No. 2—MULTOS and ISO 7816 Files*, Jul. 7, 1998 (available at http://dh007-00.web.dircon.net/present.ihtml).
MAOSCO, *Technical Bulletin No. 4—Enablement/MSM Controls Data Loading*, Dec. 4, 1998 (available at http://dh007-00.web.dircon.net/present.ihtml).
MAOSCO, *Technical Bulletin No. 5—Delegation*, Apr. 15, 1999 (available at http://dh007-00.web.dircon.net/present.ihtml).
MAOSCO, *Technical Bulletin No. 6—What's New in MULTOS*, Sep. 1, 1998 (available at http://dh007-00.web.dircon.net/present.ihtml).

What is claimed is:

1. A method for verifying an identity of an ID holder, comprising the steps providing a central switch in communication with a first network and a second network;

receiving, into the central switch, identification data from the first network, wherein the identification data has been provided by the ID holder and transmitted into the first network;

controlling the central switch to use the identification data to generate an authorization request message having a format suitable for transmission through the second network;

controlling the central switch to transmit the authorization request message into the second network to an ID issuer;

receiving, into the central switch, an authorization response message from the second network, wherein the authorization response message has been generated by the ID issuer in response to the authorization request message;

controlling the central switch to use the authorization response message to generate an output response message having a format suitable for transmission through the first network;

controlling the central switch to transmit the output response message into the first network;

storing secret data which is shared with the ID holder;

receiving, by the ID issuer, the authorization request message;

using, by the ID issuer, the secret data to perform an authentication operation upon the authorization request message, thereby generating the authorization response message; and transmitting, by the ID issuer, the authorization response message through the second network to the central switch, wherein:

the identification data includes a result of a first cryptographic operation;

the authorization response message includes a result of a second cryptographic operation;

the first network comprises an international network;

the second network comprises a trusted network;

the central switch comprises a secure electronic transaction gateway;

the authorization response message includes at least one of an indication of authorization and an indication of denial of authorization;

the authorization response message includes information about the ID holder;

the authorization response message includes a password suitable for enabling the ID holder to access a web site;

the identification data includes at least one of a payment amount field and a validation level amount field;

the authorization request message has a 0100 chip format;

the authorization response message has a 0110 format;

the output response message has an EMV format; and the identification data does not include a payment account number, said method further comprising the steps of:

issuing a digital ID to the ID holder, wherein the identification data is generated by the digital ID;

using the output response message to decide whether to provide a service to the ID holder;

using the secret data to generate a cryptographic transaction certificate;

storing transaction data related to at least one of the identification data, the authorization request message, the authentication operation, the authorization response message, and the output response message, said transaction data including said transaction certificate;

incorporating the transaction certificate into payment transaction data;

using the payment transaction data to initiate a payment;

collecting a fee from an ID requestor which has transmitted the identification data into the first network; and distributing at least one share of the fee to at least one ID issuer.

2. A system for verifying an identity of an ID holder, comprising a central switch in communication with a first network and a second network, said central switch being configured to perform the steps of:

receiving identification data from the first network;

using the identification data to generate an authorization request message having a format suitable for transmission through the second network;

transmitting the authorization request message through the second network;

receiving, from the second network, an authorization response message generated in response to the authorization request message;

using the authorization response message to generate an output message having a format suitable for transmission through the first network; and transmitting the output message through the first network, the system further comprising an ID issuer configured to perform the steps of:

storing secret data which is shared with the ID holder;

receiving the authorization request message from the central switch, through the second network;

using the secret data to perform an authentication operation upon the authorization request message, thereby generating the authorization response message; and transmitting the authorization response message to the central switch, through the second network, the system further comprising an ID requester, wherein:

the identification data includes a result of a first cryptographic operation;

the authorization response message includes a result of a second cryptographic operation;

the first network comprises an international network;

the second network comprises a trusted network;

the central switch comprises a secure electronic transaction gateway;

the authorization response message includes at least one of an indication of authorization and an indication of denial of authorization;

the authorization response message includes information about the ID holder;

the authorization response message includes a password suitable for enabling the ID holder to access a web site;

the identification data includes at least one of a payment amount field and a validation level amount field;

the authorization request message has a 0100 chip format;

the authorization response message has a 0110 format;

the output message has an EMV format;

the identification data does not include a payment account number;

the ID issuer is configured to issue a digital ID to the ID holder, wherein the identification data is generated by the digital ID;

the ID requestor is configured to use the output message to decide whether to provide a service to the ID holder;

at least one of the central switch and the ID issuer is further configured to store transaction data related to at least one of the identification data, the authorization request message, the authentication operation, the authorization response message, and the output response message, said transaction data including a cryptographic transaction certificate;

at least one of the central switch and the ID issuer is further configured to perform the steps of:

incorporating the transaction certificate into payment transaction data; and using the payment transaction data to initiate a payment; and the central switch is further configured to perform the steps of:

collecting a fee from the ID requester; and distributing at least one share of the fee to at least one ID issuer.

* * * * *